US007454364B2

(12) United States Patent
Shkedi

(10) Patent No.: US 7,454,364 B2
(45) Date of Patent: Nov. 18, 2008

(54) METHOD FOR TRANSACTING AN ADVERTISEMENT TRANSFER

(75) Inventor: Roy Shkedi, New York, NY (US)

(73) Assignee: AlmondNet, Inc., New York, NY (US)

( * ) Notice: Subject to any disclaimer, the term of this patent is extended or adjusted under 35 U.S.C. 154(b) by 49 days.

(21) Appl. No.: 11/479,832

(22) Filed: Jun. 30, 2006

(65) Prior Publication Data

US 2006/0253331 A1 Nov. 9, 2006

Related U.S. Application Data

(63) Continuation of application No. 11/177,184, filed on Jul. 8, 2005, now Pat. No. 7,072,853, which is a continuation of application No. 09/473,078, filed on Dec. 28, 1999, now Pat. No. 6,973,436.

(30) Foreign Application Priority Data

Dec. 31, 1998 (IL) ..................................... 127889

(51) Int. Cl.
*G06Q 30/00* (2006.01)

(52) U.S. Cl. ............................. 705/14; 705/10; 705/26; 705/27; 705/37; 705/400

(58) Field of Classification Search ................. 705/14, 705/26, 27, 10, 37, 400

See application file for complete search history.

(56) References Cited

U.S. PATENT DOCUMENTS 5,664,948 A 9/1997 Dimitriadis (Continued)

FOREIGN PATENT DOCUMENTS

WO  WO 97/41673  11/1997

(Continued)

OTHER PUBLICATIONS

Fife, Lee "Affiliate Programs: Glue for Distribution Networks": Faster Library, general topics.*

(Continued)

*Primary Examiner*—Jean Dario Janvier
(74) *Attorney, Agent, or Firm*—Louis J. Hoffman

(57) ABSTRACT

A method for transacting an advertisement transfer is disclosed which facilitates expressing the rate structure for the individual advertisement as a function of a profile of the individual potential customer; and which is directed to the creation of a mechanism from the vantage of an Internet site that is being visited. It should be appreciated that this must include the participation of other entities in the Internet (such as distributors, clients, intermediary agencies, etc.). The method is for transacting an advertisement transfer, from an advertisement distributor to a visitor, the method including, upon the occurrence of a visitor visitation at a communications node, the communication node performing the steps of: constructing a visitor profile; broadcasting the profile to at least one distributor; collecting responses from the at least one distributor; selecting a response from the at least one responding distributor; contracting, between the node and the at least one distributor of the selected response, a transference of an advertisement from the distributor to the visitor; and effecting a transfer of the advertisement to the visitor.

18 Claims, 8 Drawing Sheets

U.S. PATENT DOCUMENTS

| | | | |
|---|---|---|---|
| 5,724,521 A | 3/1998 | Dedrick | |
| 5,740,549 A | 4/1998 | Reilly | |
| 5,752,238 A | 5/1998 | Dedrick | |
| 5,761,683 A | 6/1998 | Logan | |
| 5,774,170 A | 6/1998 | Hite | |
| 5,794,210 A | 8/1998 | Goldhaber | |
| 5,802,299 A | 9/1998 | Logan | |
| 5,848,396 A | 12/1998 | Gerace | |
| 5,855,008 A | 12/1998 | Goldhaber | |
| 5,974,398 A | 10/1999 | Hanson | |
| 6,029,141 A | 2/2000 | Bezos | |
| 6,269,361 B1 * | 7/2001 | Davis et al. | 707/3 |
| 6,285,987 B1 | 9/2001 | Roth | |
| 6,324,519 B1 | 11/2001 | Eldering | |

FOREIGN PATENT DOCUMENTS

| | | |
|---|---|---|
| WO | WO 98/34189 | 8/1998 |

OTHER PUBLICATIONS

Newpoff, Laura, "AdOutlet.com sees market in empty advertising space" Business First of Columbus-Executive Reports: Jun. 14, 1999.*

Wang, Nelson; "Auctioning of Ad Space Gets Boot With Successful Launch of Site"; Mar. 2, 1999.

Fife, Lee; "Affiliate Programs: Glue for Distribution Networks"; (http://www.fastwater.com/Library/General/v1-4_affiliate-programs-fr.ph); Sep. 20, 1998.

Flynn, Laurie; "Goto.com's Search Engine, the Highest Bidder Shall Be Ranked First"; Business/Financial Desk; Mar. 16, 1998.

Frook, John E.; "Web sites sell ad space through auctions-Despite industry skepticism, Individual Inc. and Netscape try out new strategies"; Interactive Age; Jul. 31, 1995.

* cited by examiner

| | |
|---|---|
| Sport (5) | Fishing, Female, LA (22) |
| Fishing (10) | Sport, Age [30-40], USA (10) |
| River Fishing (0) | Fishing, Age [30-40], USA (15) |
| Sport, Female (12) | Sport, Age [40-50], USA (11) |
| Fishing, Female (17) | Fishing, Age [40-50], USA (16) |
| Sport, Male (0) | Sport, Age [30-40], Minnesota (0) |
| Fishing, Male (0) | Fishing, Age [30-40], Minnesota (0) |
| Sport, Age [30-40] (7) | Sport, Age [40-50], Minnesota (0) |
| Fishing, Age [30-40] (12) | Fishing, Age [40-50], Minnesota (0) |
| Sport, Age [40-50] (8) | Sport, Age [30-40], LA (12) |
| Fishing, Age [40-50] (13) | Fishing, Age [30-40], LA (17) |
| Sport, Female, Age [30-40] (14) | Sport, Age [40-50], LA (13) |
| Fishing, Female, Age [30-40] (19) | Fishing, Age [40-50], LA (18) |
| Sport, Female, Age [40-50] (15) | Sport, Female, Age [30-40], USA (17) |
| Fishing, Female, Age [40-50] (20) | Fishing, Female, Age [30-40], USA (22) |
| Sport, USA (8) | Sport, Female, Age [40-50], USA (18) |
| Fishing, USA (13) | Fishing, Female, Age [40-50], USA (23) |
| Sport, Minnesota (0) | Sport, Female, Age [30-40], Minnesota (0) |
| Fishing, Minnesota (0) | Fishing, Female, Age [30-40], Minnesota (0) |
| Sport, LA (10) | Sport, Female, Age [40-50], Minnesota (0) |
| Fishing, LA (15) | Fishing, Female, Age [40-50], Minnesota (0) |
| Sport, Female, USA (15) | Sport, Female, Age [30-40], LA (19) |
| Fishing, Female, USA (20) | Fishing, Female, Age [30-40], LA (24) |
| Sport, Female, Minnesota (0) | Sport, Female, Age [40-50], LA (20) |
| Fishing, Female, Minnesota (0) | Fishing, Female, Age [40-50], LA (25) |
| Sport, Female, LA (17) | |

METHOD FOR TRANSACTING AN ADVERTISEMENT TRANSFER

CROSS-REFERENCE TO RELATED APPLICATIONS

This application is a continuation of application Ser. No. 11/177,184, filed Jul. 8, 2005, now U.S. Pat. No. 7,072,853, issued Jul. 4, 2006, which is a continuation of application Ser. No. 09/473,078, filed Dec. 28, 1999, now U.S. Pat. No. 6,973,436, issued Dec. 6, 2005, and applicant claims the right of priority to Israeli application Serial No. 127889, filed Dec. 31, 1998. The disclosures of the 1998-filed and 1999-filed priority applications, including all references cited in connection with those applications, are hereby incorporated by reference.

FIELD OF THE INVENTION

This invention relates to a method for transacting an advertisement transfer. More specifically, this invention relates to advertisement transferring in data-communications networks, such as the Internet.

BACKGROUND OF THE INVENTION

Simple advertising involves placing a notice describing an availability of goods or services. To be an effective advertisement, the notice should be placed where a party, interested in the goods or services, will give attention to the notice. The advertising industry actively competes, according to the nature of the notice, to optimize the placing of the notice and to optimize the attention that the notice will receive.

Until recently, the advertisement industry placed notices as billboards, signs, inclusion in newspapers, direct mailing, and using broadcast media. Today the Internet and other interactive electronic data-communications systems provide new ground for effective advertising.

In this respect, numerous developments in the advertising industry are noteworthy:

U.S. Pat. No. 5,774,170 System and method for delivering targeted advertisements to consumers;

U.S. Pat. No. 5,752,238 Consumer-driven electronic information pricing mechanism;

U.S. Pat. No. 5,740,549 Information and advertising distribution system and method;

U.S. Pat. No. 5,664,948 Delivery of data including pre-loaded advertising data,

U.S. Pat. No. 5,802,299: Interactive system for authoring hypertext document collections;

U.S. Pat. No. 5,761,683: Techniques for changing the behavior of a link in a hypertext; and U.S. Pat. No. 5,794,210 Attention brokerage.

These technologies (and the like) are being exploited by many types of "advertising distributors" such as:

Ad reach Networks (e.g. Doubleclick, 24/7 Media, Flycast);

Local Networks (e.g. digital cities);

Broadcast Networks (e.g. Pointcast, Marimba);

Content Networks, (e.g. CNET, Disney, AOL, etc.); and

Navigation Hubs (e.g. Yahoo, Excite, Netscape, etc.).

What is nevertheless lacking in today's advertising industry is a mechanism which actively matches an individual potential customer with individual advertisements and then which expresses the rate structure for the individual advertisement as a function of a profile of the individual potential customer. Expressing the rate structure for the individual advertisement, as a function of a profile of the individual potential customer, is not a described nor a delivered product of any of the aforesaid service agencies.

SUMMARY OF THE INVENTION

The method of the present invention facilitates expressing the rate structure for the individual advertisement as a function of a profile of the individual potential customer.

The present invention is directed to the creation of a mechanism from the vantage of an Internet site that is being visited. It should be appreciated that this must include the participation of other entities in the Internet (such as distributors, clients, intermediary agencies, etc.).

The present invention relates to a method for transacting an advertisement transfer, from an advertisement distributor to a visitor, the method comprising, upon the occurrence of a visitor visitation at a communications node, the communication node performing the steps of:

(One) constructing a visitor profile;

(Two) broadcasting the profile to at least one distributor, (Three) collecting responses from the at least one distributor;

(Four) selecting a response from the at least one responding distributor, (Five) contracting, between the node and the at least one distributor of the selected response, a transference of an advertisement from the distributor to the visitor, and (Six) effecting a transfer of the advertisement to the visitor.

There are three basic embodiment types according to the present invention. Each type relates to a different mercantile perspective on contracting (step "e"): Auction; Tender; and Future inventory purchase.

Auction:

The communication node broadcasts a visitor's profile to distributors.

The interested distributors reply to the node with a price offer for that profile.

The highest offer for that profile wins the auction, which the node conducted for that profile. The node sends the distributor a message of his winning the auction and also sends a predetermined protocol or transactional authorization to pass to the visitor the auctioned advertisement.

The distributor sends the advertisement to the visitor and also sends a confirmation to the node. Alternatively, the visitor collects the advertisement from the distributor, and a confirmation is sent to the node.

Tender:

The communication node receives price offers for predetermined profile classes from at least one distributors.

When a visitor arrives, the node constructs a profile for him.

There may be among the price offers that the node has already received from the distributors, at least one price offer for a profile or a partial profile like that of the current visitor. The highest bidder, among the at least one price offers, wins the tender. The node sends the winning distributor a message of his winning the tender and also sends a predetermined protocol or transactional authorization to pass to the visitor the tendered advertisement The distributor sends the advertisement to the visitor and also sends a confirmation to the node. Alternatively, the visitor collects the advertisement from the distributor, and a confirmation is sent to the node.

Future Inventory Purchase:

Note: here the term "site" is used to relate to the communication node having a visitor visitation. If an "intermediary" is visited, then it too will represent a site.

The distributor sends a query to at least one site, in order to find out the price they charge for a specific profile that the distributor is looking for.

The sites return to the distributor the price they charge for the purchase of future inventory of the profile the distributor is looking for. According to the preferred embodiment of the present invention in this variation, the returned price is given as a function of quantity of profiles, and of planned time of advertisement campaign. The site might insert inherent discounts in the price quotes as a function of the scale of the distributor or for a preferred customer of the node.

The distributor runs an optimization program that builds a purchase plan of how many profiles to buy, from which sites, and for what price. The optimized purchase plan makes sure that for a given budget, the plan will include the highest quantity of profiles possible. The mentioned plan considers predetermined priorities and restrictions. For example, a specific percentage of the purchased inventory must come from a specific site that in the past proved itself as a good source for buyers for that advertiser.

The purchase plan is executed by sending requests to the sites in the plan having quotes of the amount of profiles that the distributor wants to purchase, the scheduled time of campaign, and the price that will be paid. The price is just for clarity purpose since it was the outcome of the offer sent by the site.

The sites send confirmation to the distributor.

Furthermore, the present invention relates to a device for transacting an advertisement transfer, from an advertisement distributor to a visitor, upon the occurrence of a visitor visitation at a communications node, comprising a sequentially linked series of modules:

(One) a first module for constructing a visitor profile;
(Two) a second module for broadcasting the profile to at least one distributor,
(Three) a third module for collecting responses from the at least one distributor,
(Four) a fourth module for selecting a response from the at least one responding distributors;
(Five) a fifth module for contracting, between the node and the at least one distributor of the selected response, a transference of an advertisement from the distributor to the visitor, and
(Six) a sixth module for effecting a transfer of the advertisement to the visitor.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 7 illustrates a listing of bids following the organization presented in FIG. 6;

DETAILED DESCRIPTION OF A PREFERRED EMBODIMENT

Figure 1:
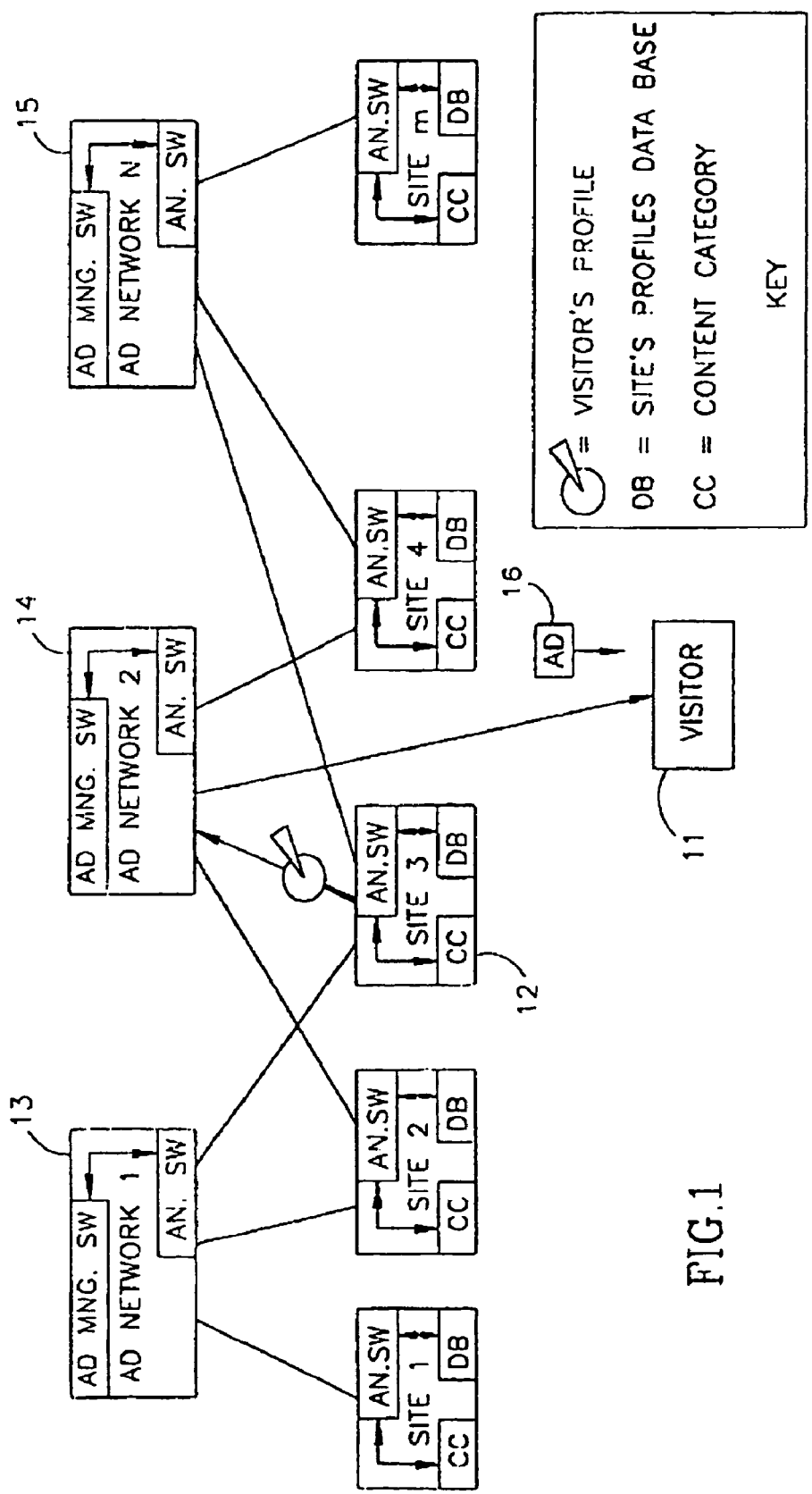
FIG. 1 illustrates an organizational chart for basic advertisement transfer transacting.

In the context of the present invention, a "communications node" is the server of an Internet site or is a theoretical pairing of the server of the Internet site with the server of an "intermediary" site, or the like. Equivalently, according to the present invention, a "communication node" may be an apparatus in a data-communications transfer architecture wherein is located automatic data processing or like computer related task processes, or may be a wired or wireless communications network routing juncture. Furthermore, in the context of other applicable communications architectures, a communications node is a web-TV content provider, a multi-media contents provider, or any intermediary purveyor transferring these contents.

In the context of the present invention, a "distributor" is a contracting agent responsible for assigning at least one advertisement to a specific medium: for example, placing a banner on a web page, placing a notice for sale on an accessible index entry, a content referral or an advertisement. In the context of the present invention, the payment could be for showing an ad to the visitor with the profile looked after by the distributor, or for that visitor clicking the distributor's ad and visiting the distributor's site; or for that visitor giving information about himself to the distributor whether through the ad or on the distributor's site after reaching the site by clicking the ad; or for that visitor downloading a software from the distributor, or for that visitor buying a merchandise from the distributor; and so forth.

The present invention relates to a method for transacting an advertisement transfer, from an advertisement distributor to a visitor, the method comprising, upon the occurrence of a visitor visitation at a communications node, the communication node performing the steps of:

(One) constructing a visitor profile;
(Two) broadcasting the profile to at least one distributor;
(Three) collecting responses from the at least one distributor;
(Four) selecting a response from the at least one responding distributors;
(Five) contracting, between the node and the at least one distributor of the selected response, a transference of an advertisement from the distributor to the visitor; and
(Six) effecting a transfer of the advertisement to the visitor.

In general, the transactional universe of the Internet may be described as including visitors, sites that they visit, and distributors who provide network advertisements for viewing by the visitors. The transferring, per se, is not an essential feature of the present method wherein selecting is in order to facilitate such an eventual transfer.

Visitors are normally individuals who elect to view an Internet page. In most circumstances, this election is facilitated by following a hyperlink from some other Internet page, which has redirected the present elected viewing. Sometimes, this election is done with the aid of a search engine, while other times the user elects an Internet page to view by choosing from a personal list of hyperlinks. Of somewhat lesser importance, a visitor may be a "robotic Internet tourist" such as an agent, a search engine, an auditing or monitoring program, etc.

Sites which are visited are Internet HTML pages (or VRML "pages" or the like) which generally reside in server accessible data storage archives. These sites often include hyperlink references for allowing a visitor to simultaneously view external content items from other Internet addresses. Presently, the most widely used reference inclusion is for advertisement banners. The content of these banners is not included at the site. Rather the site includes an Internet address for the banner, and the visitor's software visits the banner to bring a copy of it for inclusion into the overall site viewing.

Often, banners are grouped into cyclically repeating aggregations by an advertisement distributor. The distributor establishes an Internet site for downloading banners. Furthermore, the distributor effects a substitution of the content of this Internet site on a frequent basis. The result is that the visitor will view a different banner (inserted into a site) virtually each time he accesses that site. Clearly, the reference inclusion of the site is to a dynamic advertisement management distributor.

FIG. 1 is an organizational chart for basic advertisement transfer transacting. For schematic clarity, the topologically complex Internet has been represented as having three strata. The lower stratum is for visitors, the central stratum is for sites, and the upper stratum is for distributors. Actually, the visitors, sites, and distributors are clients or servers or memory storage locations accessible therein.

Here the "Visitor" 11 visits "Site 3" 12; site 3 builds the visitor profile and broadcasts it to advertisement Network 1-n (distributors) 13-15; advertisement "Network 2" 14 wins the contract; and provides the visitor with the "Ad" 16.

Figure 2:
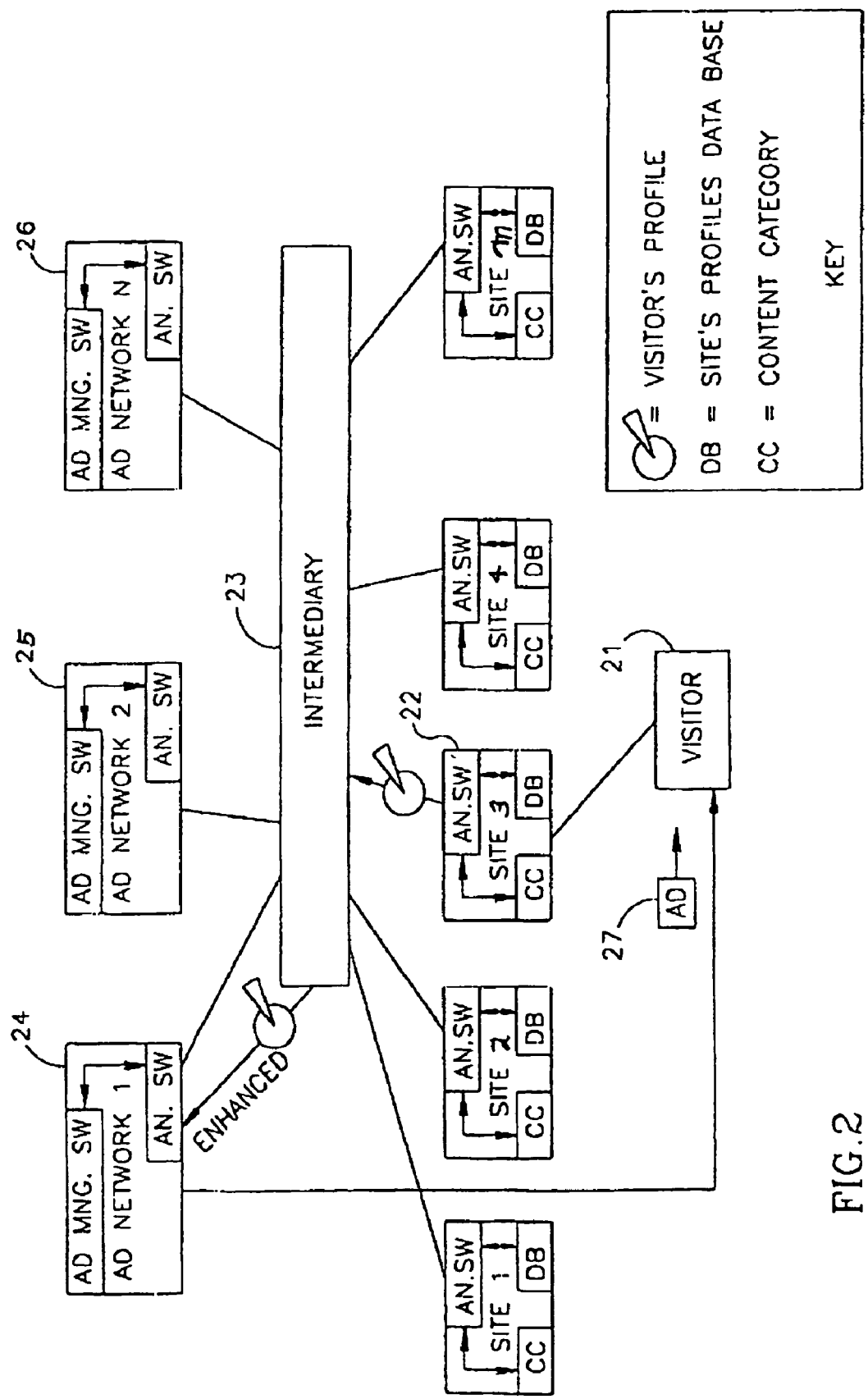
FIG. 2 illustrates an organizational chart for centralized servicing of advertisement transfer transacting.

FIG. 2 is an organizational chart for centralized servicing of advertisement transfer transacting. Here the "Visitor" 21 visits "Site 3" 22; "site 3" builds the visitor profile and transfers it to the intermediary 23. The intermediary enhances the profile and broadcasts it to advertisement Network 1-n (distributors) 24-26; advertisement "Network 1" 24 wins the contract; and provides the visitor with the "Ad" 27.

According to an embodiment of the present invention, the communications node collects generalized response descriptors from the at least one distributor, and the broadcasting (step b) is done internally using the collected descriptors as proxy for the at least one distributor.

For example, any entity that owns an advertisement distributing mechanism, such as advertisement management software, can become a distributor. Nevertheless, the typical distributor will probably be one of the following:

An advertiser wishing to integrate the vertical chain between him and the visitor;
An advertising agency wishing to cut down advertisement distribution' costs;
An interactive advertising agency wishing to cut down the advertisement distribution costs;
Advertisement Network; or
Content Providers wishing to expand the reach they offer their advertisers by becoming distributors to other content providers.

Economically, creating value has been described as a logistics composite model called the value chain, which is a series of value-adding activities that connect a company's supply-side with its demand-side. The model treats information as a support element and not as a source of value itself. An integrated suite of value chain management solutions is designed to synchronize demand opportunities with supply constraints and logistics operations. In the context of information commerce, the value chain model is facile for structuring the electronic advertisement transaction processes of the present invention.

Figure 3:
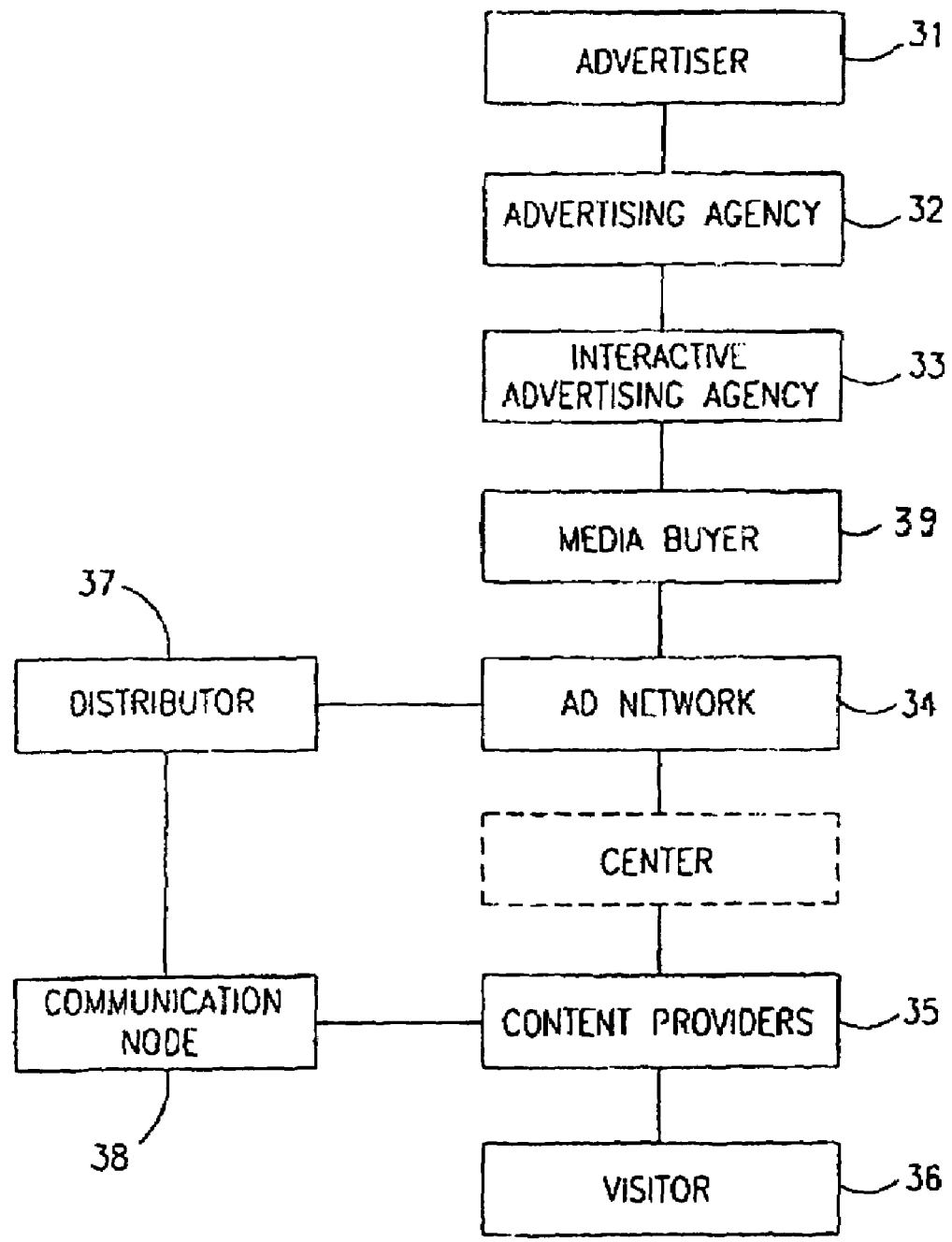
FIG. 3 illustrates equivalent-level parallel-structuring between an advertiser sector and a distributor sector.

Turning to FIG. 3, there is a vertical value chain from the advertiser 31 to an advertising agency 32 to an interactive advertising agency 33 to an advertising network 34 to a virtual matching center (not shown) to a content provider 35 to a visitor 36. In parallel there is a value chain having a distributor 37 at the top and a communications node 38 below. In the context of the understanding of the present invention, the distributor has transaction interaction with the advertising network, and the communications node has transaction interaction with the virtual matching center (according to the preferred embodiment) or to the content provider. Sometimes there is a media buyer 39 who can be between 33 and 34; which may alternatively be included in other segments of the vertical chain 31-33.

According to an embodiment of the present invention, the visitor profile includes at least one item selected from: content's categories of the content the visitor requested or is watching; key words, which classify the content the visitor requested or is watching; Time of day relative to server; Derivatives of the visitor's IP address, e.g., Domain; Geographic location of the visitor's ISP (Internet Service Provider) or OSP (On line Service Provider), Geographic location of the visitor's company or organization if connected through a permanent point to point connection, Time of day relative to user as a derivative of his geographic location, Internet Service Provider (ISP), On-line Service Provider (OSP); Browser type; Operating system; or SIC code.

For example, Geographic location of the visitor's ISP (Internet Service Provider) or OSP (On line Service Provider) if connected through dial modem or cable modem; or Geographic location of the visitor's company or organization if connected through a permanent point to point connection. In that case additional information from some databases might be given on the visitor's organization such as: company's revenues and number of employees.

There are also the possibilities of enhancing the visitor profile using databases connected to the system to provide additional information about the visitor, which might be available. This information is divided into non-volunteered information and volunteered information.

Non-volunteered information is information about the visitor's history in the site or other sites connected to the same network or sites that are connected to the same global database. Such history may include all the immediate information available on the user at the time of these visits, products he was interested in or bought, advertisements he clicked on.

Volunteered information is any information the visitor might have given out of his own free-will, such as demographic (or psycho-graphic) information, including: gender; age; annual household income; number, gender, age and status of household members; occupation; Hobbies and tendencies; or Name and address.

According to the preferred embodiment of the present invention, the node or the distributor or the intermediary is audited. In the context of the present invention, "Auditing" relates to: measurement of web traffic; analysis of online advertisement campaign results; analysis of transaction data; or analysis of customer profiles. Furthermore, auditing may include: verification of any combination of the above; analysis of any combination of the above; or analysis of any bills that are derivatives of the above.

The analysis of the above is done in off line mode or real time mode; and is made through the perspective of one of the following: Site, advertisements distributor, online campaign manager, or e-commerce merchant. Examples of companies that perform some or all of the above are: I/PRO, MediaMetrix and Andromedia.

According to the preferred embodiment of the present invention, the broadcasting, contracting, or transferring is encrypted.

According to the present invention, the advertisements are selected from the list: banners, text, HTML page address pointers, text, hypertext, audio content, visual content, or any combination thereof. Equivalently, the advertisement may be of any kind and size: static, animated, DHTML, multimedia—video and/or audio, three dimensional, VRML, interstitial, interactive banner, "transitional" interstitial (a multimedia advertisement in a pop up window between page views), InfoAd, Active Ad, expanding banners, nano site or mini site in a banner.

According to the preferred embodiment of the present invention, the method further includes the construction of at least one of the following: an email list, or a database. Equivalently, the construction is of at least one of the following: an e-mail list, traffic analysis of the site which is enhanced by the additional information about the visitors' profiles, databases of potential customers to different products according to their profiles.

According to one embodiment of the present invention, the selecting (step "d") is of multiple responses.

According to one embodiment of the present invention, the contracting (step "e") is with any responding distributor bidding above a predetermined threshold price, and the threshold price is not broadcast.

According to one embodiment of the present invention, the visitor submits a self-disclosure profile to the node. According to one embodiment of the present invention, the visitor profile is constructed from header information in the visitor's transmission. According to one embodiment of the present invention, a rate structure for the contracting is determined according to a matching between the visitor's profile and an advertisement specification in the response.

According to one embodiment of the present invention, the contracting includes at least one transaction segment describing the visitor, describing the node, describing the advertisement, and describing the distributor. For example, the at least one segment includes a Boolean logic section, a rate structure logic, disclosure information, or disclosure logic information.

According to one embodiment of the present invention, the method further includes a follow-up visit by the visitor to an address associated with the transacted advertisement. Furthermore, the follow-up visit may be audited; the audit may include an item selected from the list: a purchase by the visitor of a service or commodity at a "site" specified in the transferred advertisement, or pointed to therefrom. According to another enhanced variation of the present invention, the node or his authorized agent receives a payment resulting from the visitor's purchase at a site specified in the transferred advertisement, or pointed to therefrom.

According to one embodiment of the present invention, the method further includes an intermediary between the node having a visitation and the at least one distributor, and the intermediary is for effecting additions to the visitor profile constructed by the node in step "a" or is for effecting any of steps "b" through "f".

Both using and in the absence of the intermediary, according to an enhanced embodiment of the present invention, the visitor discloses his node-appropriate cookie and said cookie is analyzed by the node, the intermediary, the distributor, or an address associated with the transacted advertisement Another enhanced embodiment of the present invention may include: the visitor specifies a self imposed censorship restriction in order to void acceptance of certain classes of advertising, or in order to designate a class of advertising preferences; or constructing a visitor profile includes correlating known visitor identification parameters with a database.

Further enhanced embodiments of the present invention include: the logic protocol of the selecting is according to a relational database query semantic; the visitor is associated with a commercial enterprise, a search engine, an automaton, a corporate person, or a human; effecting, contracting, or constructing includes recording or storing advertisements transferred to the visitor for intentional subsequent transfer to the same visitor or for intentional avoidance of subsequent transfer to the same visitor.

The present invention also relates to a device for transacting an advertisement transfer, from an advertisement distributor to a visitor, upon the occurrence of a visitor visitation at a communications node, comprising a sequentially linked series of modules:

(One) a first module for constructing a visitor profile;
(Two) a second module for broadcasting the profile to at least one distributor;
(Three) a third module for collecting responses from the at least one distributor;
(Four) a fourth module for selecting a response from the at least one responding distributors;
(Five) a fifth module for contracting, between the node and the at least one distributor of the selected response, a transference of an advertisement from the distributor to the visitor; and
(Six) a sixth module for effecting a transfer of the advertisement to the visitor.

According to the preferred embodiment, the modules are distributed or fragmented between more than one computer processor or network communications server or network communications router.

According to the preferred embodiment, there is further provided at least one memory media containing data collected or data constructed in at least one of the modules.

According to the preferred embodiment, there is further included a distributor response module for optimizing a selection from a plurality of broadcast profiles.

Furthermore, according to the preferred embodiment, the optimizing is according to a fixed budget, or according to an advertisement campaign model, or according to subsequent modifications thereto.

The preferred embodiment of the present invention may be briefly described as allowing:

The distributor can choose the number of advertisement exposures for a visitor with a specific profile.
The system will make sure it will be done for any one person with such a profile.
There is no need to store or record the advertisement since a distributor gives a price offer for a specific profile and intends to show a specific advertisement for that profile. After a given number of advertisement exposures to a specific person, the distributor will no longer bid for that person although suited for the required profile.
The person is identified by a cookie that differentiates two people with the same profile but different number of exposures to the same ad.

A distributor is constantly updated in real time by the node/nodes (node in the intermediary architecture and nodes in the distributed architecture) that are members of its network, of the winning bids for different profiles in the sites.

The distributor can choose to change its price offers for different profiles in different sites in order to change its odds for winning.

The distributor can run an optimization program that will change the price offers in real time. The optimization factors are the campaign progression and the budget spending (in general the factors are based on the advertising model).

A visitor can limit his profile by approaching the site he visits and specifying restrictions to his profile, by his own choice or demands. The visitor can point out whether he wants the restrictions to be for the communication node use only or for the intermediary or for the distributor or any combination thereof. If the restrictions are for the intermediary or for the distributor the communication node will point it out to the intermediary.

Furthermore, there is an opportunity to pay for the visitor's name and address, without need to refer to this specific since the name and address are among the volunteered information and therefore a price can be set for them as for any other component composing the profile.

A real time updated bidding system among unlimited number of Suppliers and Mediators\Buyers for electronic or tangible assets\commodities (hereafter will be referred as the 'system').

The system makes the market for those assets economically efficient as follows:

Enabling "Many-to-Many" business relations among all the participating sites;

Each Mediator\Buyer can compete for every asset offered by a Supplier,

Each Mediator\Buyer can update its bid in real time according to information about the winning bids in the system.

For example: A Mediator conveys to the system a bid of a Buyer that includes a price list for the asset he is looking for according to the potential characteristics of the asset. When a Supplier has an asset or commodity to sell, he conveys its characteristics to the system (hereafter we will refer to the asset's characteristics as the asset's profile). The system performs a semi-real time tender over the asset's profile between the pre given bids (it is semi real time since the tender is performed over already existing bids in the system). The highest bidder is notified of his winning and the whereabouts of the asset. The rest of the bidders and Mediators connected to the system are notified of the asset's profile that just been sold and its winning bidding price. The Mediators\Buyers, in return to the information can update their bids in real time using manually intervention or automatic optimization software.

Equivalently, the preferred embodiment of the present invention may be briefly described as allowing Internet advertising where the:

Buyers are Advertisers or Advertising agencies or media buyers (entities in the value chain may integrate forward or backward);

Mediators are advertisement Networks; (The advertiser's may accordingly be further provided with ability to enter a price limit for a desired profile in order to enhance his winning probability or strategically there may be provided facilities for expressing a priority given to bigger budgets in the case of similar price offers.).

Suppliers are Publishers or Content Providers sites, or a server of an ISP, etc.;

The assets are Visitors' profiles of visitors to the Publishers' sites; or even

Commodities selling (electronic commodities or tangible commodities).

Furthermore, implementations may include: a Central system with a star configuration which connects all participating sites: Suppliers, Mediators\Buyers; or a distributed system where the tenders are taking place at the Suppliers locations according to pre given bids by Mediators\Buyers.

A Description of Algorithmic Procedures Used to Implement the Preferred Embodiment of the Method of the Present Invention This description presents an efficient method of creating a profile-matching tree. This matching tree is a memory-cached structure used for efficiently matching an incoming user profile to the highest bidder using an online tender or to a buyer who bought such a profile in advance (referred as 'Future Inventory Purchase' or 'FIP'). For example, an implementation of a real time tender over a visitor's profile may be according to predefined price offers (bids) which are supplied by advertisers through their representatives. The system allows a price limit to be set (in accordance with a fixed or a dynamic advertising budget), such that the advertiser specifies a maximum price it is willing to pay to the visitor's ad space owner. Likewise, in the event that two or more distributors are equally well suited to convey the advertisement, provision may be made to give preference to the distributor having the largest campaign budget or turnover or the like.

There are three stages in this process:

Creating a price offer (bid) by the advertiser. The price offer is represented by a collection of attributes and attribute values. Each such collection represents a number of profile combinations according to the logic defined in this collection. Using a tree of attribute values makes the process of defining the price offer very easy and intuitive for the user.

Building a matching tree in a batch process. This matching tree contains all possible profiles for which an advertiser is willing to pay. Every node in the matching tree contains a list of all relevant bids sorted in descending order by their prices.

In real time, for every incoming visitor's profile, the highest bid for the visitor is found by searching the matching tree. The highest bidder has the right to present his advertisement to that visitor.

As part of the above described process of a real-time matching between an incoming visitor's profile to a profile required by an advertiser, the advertiser has the alternative of buying in advance the visitor's profile he is looking for, without participating in a tender.

Introduction

A software engine, according to the present invention, supplies a method for efficient allocation of a visitor's advertisement space according to its profile by conducting an online tender among all advertisers that are connected to the system via their representatives, the advertisement networks, outsourcing services or privately owned advertisement management software. Each advertiser presents a collection of advertisement campaigns intended for the visitors. There are certain criteria for each advertisement campaign that are based on the required visitor's profile. These criteria determine which visitor will get an advertisement of this campaign. For every advertisement campaign, the advertiser's price offer includes a set of required profiles that needs to be matched with any visitor's profile. The advertiser places price tags and logic tags on every requested characteristic, thus creating a combination of user profiles.

The collection of all price offers, sent or otherwise established by the advertisers, creates a profile pool. For every visitor which is directed to the system there is a three-stage process:

Finding the price offers that matches the incoming visitor's profile.

Of all matching price offers finding the one with the highest price.

Allocating the visitor's advertisement space to the matched advertiser from those found having the highest price.

As part of the above process, the method of the present invention allows advertisers to receive required profiles without participating in a tender. The advertiser purchases a future inventory of visitors' profiles from sites using the method of the present invention. In the "finding the one with the highest price" stage, in front of the price offers participating in the tender, a priority will be given to an advertiser who bought such a profile in advance. If such a profile was bought in advance by an advertiser, first, the visitor's advertisement space will be allocated to him in the allocating stage.

The load is produced by the visitors' traffic to Internet sites, thus creating a potentially enormous number of hits. The matching process must take a minimal time to calculate (see use of constraints and optimizations below).

In order to minimize the search, match and allocation time, a matching tree is built, which serves as a structure for the search and match operation. The tree is modified for every addition or extraction of a price offer. Using a matching tree, the operation of finding the best match is merely a question of searching the matching tree.

More specifically, the process will be described in the following sections:

Creating and spreading the price offer,
Constructing and managing a matching tree;
Searching the matching tree for the Profile; and
Allocating the visitor's advertisement space.

Nomenclature Examples

Price Offer/Bid—A collection of attributes or attributes' values which form a combination of visitors' profiles:

Attribute—An attribute is used for describing a user characteristic using a value from the attribute's set of values. Each attribute has a tree of its own unique values. For example, the Gender attribute has the values: such as Male, Female (one level tree). The Location attribute has a tree of value, where Europe can be a value in the tree, England and France can be sub values of Europe (its children in the value tree), and London can be a sub value of England.

Attribute Order—All attributes are organized in a predefined ordered vector. Each attribute has its own unique order, which is determined by the position of the attribute in the vector. The order is used for the process of building and searching the matching tree. Any collection of attributes is usually sorted according to their unique order.

Category Attribute—An attribute whose values can be represented by a final set of known elements (e.g. Gender, Location).

Numeric Attribute—An attribute whose values can be represented by two numbers which form a range (e.g. Age, Income).

Value—An element that is assigned to an attribute's value tree.

Logic tag—Any attribute or value can have a logic tag that can be one of the following:

Must—The visitor must have the attribute or value.

Must not—The visitor must not have this value (for values only).

Note: Must "logic" cannot be set on multiple values that shares the same attribute.

Price—can be set for each value (that does not have a "Must Not" tag). Values that have a price and do not have any logic tags, are optional values that may or may not exist in a matching profile (the value is not a requirement set by the advertiser, but the advertiser is willing to pay more for a visitor's profile that contains this value).

The price offer can have a maximum price that represents an upper bound that the advertiser is willing to pay for any given profile (note that a single price offer can offer different prices for different profiles according to the attributes in the incoming profile). If the sum of prices for profile attributes results in a price higher than the maximum price, then the price for this combination of attribute values will be set to the maximum price.

Visitor's Profile—This is the collection of pairs Attribute=Value for a current visitor. The Attributes in this collection are sorted by the attribute's predefined order. This collection represents the information known about the incoming visitor.

Matching Tree Branch—Each branch in the matching tree represents a possible collection of values that were extracted from price offer(s), and have a price in the system (zero can be also a price for profiles which include a value with a Must Not logic). This collection forms a possible visitor's profile.

Value trees and Inheritance—the values of an attribute are presented and managed as a hierarchical structure.

Descendant values inherit their ancestor's value (in the hierarchical structure) price and logic tags. For example, the Location attribute can have the values: Asia, Europe, Africa etc. Each of these continents have descendants country values that inherit the continents prices and logic tags and so on (states, cities etc.). If an advertiser places a price Px on Europe, then all the sub values of Europe will have the same price Px. If a visitor's profile contains the location London, then the advertiser will be willing to pay a Px price for this attribute. Similarly, a Must tag set on the Sports value of the Content attribute determines that the visitor has to have a content value that is Sports or a descendant of Sports (Basketball will be accepted as well).

Overview of the Price Offer Phase

Creating a price offer—The advertiser/media buyer/sales person uses a GUI (graphical user interface) to enter a valid price offer. There are two types of attributes allowed in the system.

Category attributes—The attribute is a category with predefined values. The values are all named. For example: attribute Gender with the values Male, Female.

Numeric Attributes—These are also category attributes with predefined numeric ranges. For example, Income is such an attribute, Age is another.

All attributes have predefined values. The values are determined according to well known conventions that make it easier to measure them. Also, all hierarchies are predefined and known in advance. The advertiser may set the prices and logic tags for these predefined attributes/values, and may not be able to define other attributes of values.

Figure 4:
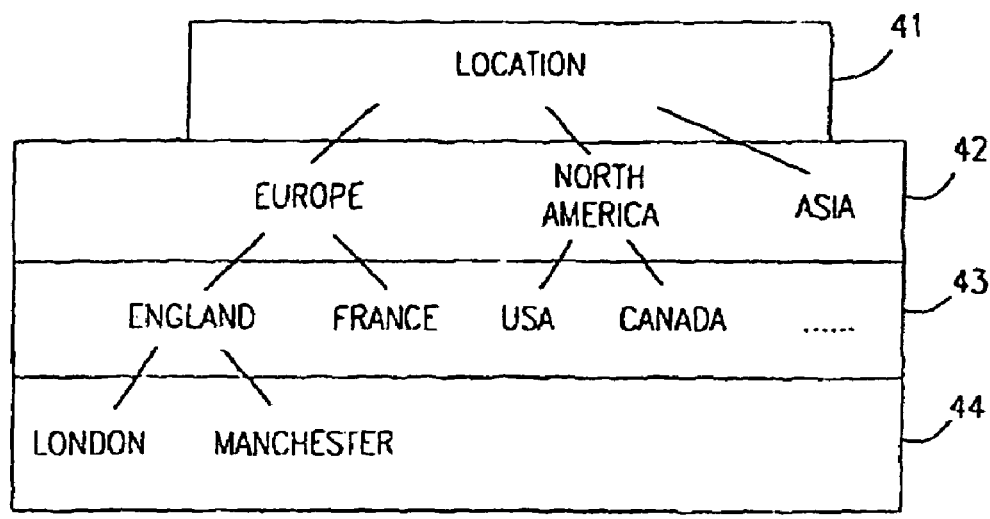
FIG. 4 illustrates a typical hierarchical regional stratification organization.

The available attributes are presented in a tree-like view. This means that there is a predefined hierarchy between the values. The hierarchy is always defined for a specific attribute. For example under the attribute Location we can define the following values:

Turning to FIG. 4, a root node "location" 41 is divided into continents 42, therein into countries 43, and therein into cities 44. All these values will be declared "under" the Location attribute, as a hierarchy.

An important attribute, which has a complex value tree, is the content attribute.

For every attribute and value, a logic tag can be attached:

'Must'—This logic indicates that the attribute or value must exist in the visitor's profile or else the visitor will be of no interest to this price offer. If the 'Must' is put on a value (for example 'Sports') it means that the specific value must exist in the visitor's profile, or a descendant value of this value (for example, 'Basketball'). If the 'Must' is put on the attribute itself then it means that "one" of the tagged values of this attribute must appear in any visitor's profile. The tagged values are any of the values which belong to the attribute and have a price tag attached.

'Must Not'—The logic means that the "value" must not exist in the incoming profile. This logic is only acceptable when put over values and not attributes.

The user should provide a price tag for all values of interest. It is important to note that if a value was set to 'Must', a price tag on other values which belongs to the same attribute can be placed only if these values are value-tree descendants of the Must value.

The user can select the price offer to be valid in certain sites, or exclude the offer from certain sites. In addition certain sites can be attached with a special price tag which indicates that the profile's price should be increased or decreased by a certain percentage. Forcing or excluding sites is effected by adding the specific site as an attribute with a Must/Must Not logic.

A maximum price can be set for the profile. In this case, no matter how much was the total price of the attribute combination, it will not exceed the maximum price.

The result is a collection of bids B1 ... Bn, described as following:

Every Bi has a collection of attributes with Must tags, and a collection of values with price tags, Must tags, and Must Not tags. Also, every Bi has a max price Max-Bi.

Spreading the Price Offer

This is the first phase in the construction of the search tree. Each bid Bi, is spread into a collection of "profiles" that match the bid. These "profiles" are actually a series of attribute values that form a branch in the matching tree. The visitor's profile itself may contain other attributes' values that are of no interest to this bid, but may still match the bid. The bid spreading is done in the following way:

Create a Vector "A" of Bid Attributes that is sorted by an attribute predefined order (the "unique" order described above). A Bid Attribute holds an attribute, an optional Must tag, and a vector of values. Bid Attributes in vector "A" are built for each one of the attributes with a Must tag in the bid, and for any additional attributes whose values appear in the bid Bi with price tags, Must tags or Must Not tags. This results in a vector of bid attributes A1 ... Am.

For each bid attribute Aj ($1<=j<=m$) create a vector of values. Each Aj will include all the values in the bid Bi that correspond to the attribute Aj. Note that every attribute must have at least one value that corresponds to it.

Attach Must tag to each bid attribute Aj if the corresponding attribute was marked with Must tag in the bid, or if one of its values was marked with Must tag (there can be only one Must value to that bid attribute).

Figure 5:
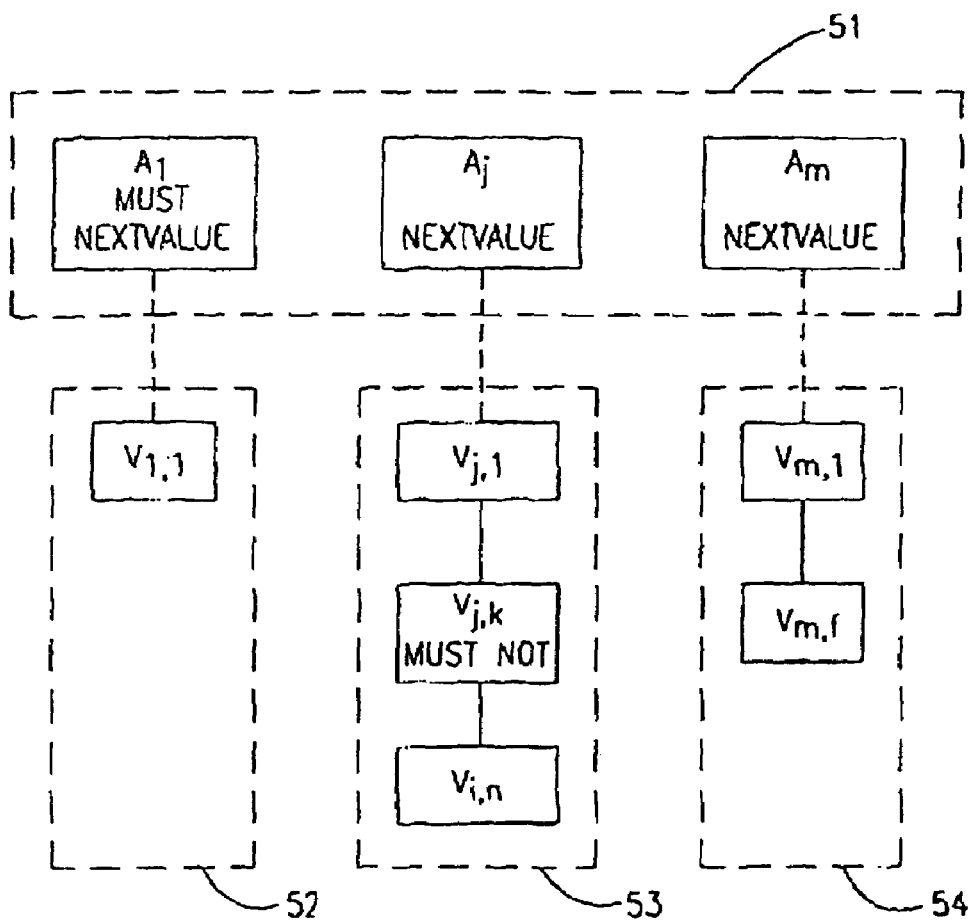
FIG. 5 illustrates a schematic diagram of bid attributes.

FIG. 5 is a diagram of bid attributes, where each bid attribute 51 (e.g. $A_1, A_j, \ldots A_m$) holds its corresponding attribute, an optional Must tag, and a vector of values, e.g. 52, 53, 54.

This structure is used in order to create all combinations of attribute values that actually define the profiles.

To construct all the profile combinations follow these two steps:

Step one: find which bid attributes will be part of the next attribute combination. This is done in the following way:

Suppose there are p free (non Must) bid attributes in the vector "A"; Then the total number of subsets of these free attributes (sorted in their predefined order) is $2^p$.

Run a counter from 0 to $2^p-1$. We will use the binary representation of this counter to determine which bid attributes will take part in the next attribute combination. For each iteration of the counter, select the bid attributes that will take part in the next combination vector in the following way:

For each attribute Aj in the vector "A":

If Aj has a Must tag, select it to the next combination.

Otherwise, Aj is a free bid attribute. Let k be its index among the free bid attributes ($0<=k<p$). Select the attribute Aj if and only if the k-bit in the binary representation of the counter is set to 1.

Note that each attribute combination contains all the bid attributes that were marked with Must tag, and a subset of "free" attributes that were selected according to the binary representation of the counter.

Step two: For each attribute combination that was selected in step one, generate all the profile combinations of the selected attributes (each profile is represented by a vector of values).

It should be recalled that every bid attribute holds a vector of values that correspond to their attribute. If a value V has a Must tag in the bid, its bid attribute Aj will also be marked with a Must tag, and V will be its only must value in the values vector. If an attribute Aj was marked with a Must tag in the bid, it will be marked with a Must tag in its bid attribute, and it may hold several values, none of them are Must values.

Each profile combination contains one value from each attribute that was selected (and always one value of any Must attribute).

This is done by cycling between the values of each selected bid attribute (note that for a Must value V, its bid attribute is also marked as Must in the vector A. If there are additional values to the same attribute, then V will not take part in all the combinations).

The cycling is done using a NextValueIndex for each bid attribute, that points to the next value of the bid attribute that will be selected for the next profile combination (all indexes are initialized to 0—the index of the first value).

Increasing the NextValueIndex will set the index to point to the next value in the bid attribute. If the NextValueIndex is set to the last value, increasing it will set the index to the first value and a cycle is completed.

To generate all profile combinations for the selected bid attributes, perform the following steps for each selected bid attribute until the last bid attribute (of the selected bid attributes) has finished a cycle (then select a new attribute combinations):

Creating a Single Profile Combination:

For each selected bid attribute in the current attribute combination:

Add the next value that the attribute's NextValueIndex points to for the next profile combination.

If the previous bid attribute completed a cycle, or this is the first bid attribute in the selected attribute combination, move the NextValueIndex to the next value.

If the last attribute in the attribute combination completed a cycle then return to step one—and choose another attribute combination (subset of attributes).

Determining the Price of Each Profile Combination:

A given bid is spread into a large number of profile combinations. Each of these combinations may have a different price. The price of a profile combination is the sum of prices for all the values in the combination. The sum of prices of values with Must tags is a fixed price for every combination and can be referred to as a base price of the bid.

The base price of a bid is the price that the advertiser is willing to pay for every visitor whose profile has all the required values of the bid (the Must values of the bid). Any additional (optional) values in a combination can increase the price for a specific profile.

If a bid has a Must value and additional values of the same attribute (any such additional values must be a value-tree descendant of the Must value), then some combinations may not contain the Must value itself, but rather its descendant value instead. Nevertheless, the base price will include the Must value, even if it is not in the combination. For example, if a bid offers 3¢ for 'Sports' with a Must tag, and 2¢ for 'Basketball' as optional (both of the 'Content' attribute), then some combinations will include 'Sports' with a price of 3¢ and others will include 'Basketball' with a price of 5¢.

In addition, every bid can have a maximum price for which any profile combination may not exceed. If the price for a profile combination exceeds the maximal price, then the price will be set to the maximal price.

While creating the combination of values, if one of the values in the combination is a Must Not value, then the price Px will be set to 0, and no other values will be entered to the combination after the Must Not value.

If one of the attributes is the Site attribute, the price may vary according to the site by a predefined factor q (Site is a special attribute): Px=(1+q)Px. The factor q can be negative, meaning that for this site the advertiser is willing to pay less!

The result of the spreading phase is a collection of profile combination vectors, with a price for each profile combination.

It should be noted that dealing this way with the Must Not values may result in some identical vectors. These vectors will be overwritten while inserting them into the matching tree.

Each combination that was created is actually a branch in the Matching Tree, which corresponds to the bid Bi. The process should be repeated for every bid.

Here is a simple example of spreading a bid:

Suppose a bid contains the following:

| | | | |
|---|---|---|---|
| Male - Must - 3¢ | Age (18-35) - 5¢ | | |
| Location - Must. | England - 5¢ | France - 3¢ | Basketball - 1¢ |
| Football - 2¢ | Tennis - 3¢ | | |

The vector "A" of bid attributes will contain the following:

| Gender (Must) | Age | Location(Must) | Content |
|---|---|---|---|
| Male (Must, 3¢) | 18-35 (5¢) | England(5¢)<br>France (3¢) | Basketball (1¢)<br>Football (2¢)<br>Tennis (3¢) |

The attribute combinations will be:

(Gender, Location); or (Gender, Age, Location); or (Gender, Location, Content); or (Gender, Age, Location, Content).

(Note that there are total of 4 attribute combinations: 2 brought to the power of the number of "free" attributes).

Now, for each of the attribute combination, we need to generate all the combinations of values (which make a "profile combination").

In this example we will do so only with the (Gender, Location, Content) combination.

The values for this attribute combination are:

Male, England, Basketball (9¢)

Male, France, Basketball (7¢)

Male, England, Football (10¢)

Male, France, Football (8¢)

Male, England, Tennis (11¢)

Male, France, Tennis (9¢)

Constructing and Managing the Matching Tree Adding a New Bid

Adding a new bid to the matching tree is a process that is done by:

creating a branch for each one of the bid's profile combinations, and adding the bid's number and the combination's price to a list that is sorted in descending order by price, and resides at the last node of the branch.

(a branch may already exist for a given combination, in this case follow the branch to the combination's last value, and insert the bid's code and the combination's price in the last node that was reached).

While inserting the bid's combination, the bid may be inserted into other branches as well, and sub tree may be copied under newly created nodes. In addition, each bid keeps a list called Bid's Nodes that contains all the nodes that the bid resides in, and used for fast removal of bids from the tree.

The process of adding a new bid to the tree starts by spreading the bid into a set of profile combinations. Each profile combination is then inserted into the tree, by reading all its values (in a predefined order) while moving down the tree and performing several operations on the tree.

The following description uses current node and current value to define the current state of the insertion process. For each profile combination, the process of insertion starts with the tree root as the current node and the first value of the profile combination as the current value. When adding the current value (e.g. England) as a child to the current node, check if other children of the current node are "value tree ancestors" of the current value (e.g. Europe), or "value tree descendants" of the current value (e.g. London). Also check the predefined attribute order of all the other children (in comparison with the order of the current value) and update the matching tree accordingly.

Here is a schematic description of the process:

1. For each of the bid's profile combination:

1.2. Current node=matching tree root.

1.3. For each value in the combination vector sorted by the predefined order of the value's attribute (referred to as Current Value):

1.3.1 If current node has a child that equals the profile's current value, then set next child to this child. Go to 1.3.3.

1.3.2 Else (No child equals the current value):

Create a new child with the current value, to the current node. And mark it as the next child.

Climb the value-tree of the current value, find the first value of the value's ancestors (by order of climbing) that matches one of the current node's children. If such value exists, then copy the matching child's sub tree under the newly created child.

1.3.3. For each of the current node's children:

If the child is a descendant in the value tree of the current value, then recursively enter the rest of the profile's values (the profile's tail without the current value) to this child.

If the child's predefined attribute order (unique order—discussed above) is greater than the current value order, and the current node is a newly created node with no children, then copy the sub tree of the child (including the child itself) under the newly created node.

If the child's predefined attribute order is smaller than the order of the current value, then recursively enter the profile's tail (including the current value) to this child.

Set the current node to the next child.

Continue to the next value (1.3).

1.4. After all the profiles' values were entered into the matching tree, the bid and the price of the profile combination will be inserted into the Matching Bids list that resides in the current node or into the Future Inventory Purchase list that also resides in the current node (in case the bid is marked as a future inventory purchase). If the bid is already in the list with a lower price than the new combination's price, remove the old bid from the list. If the bid is not in the list, insert the bid with its new price into the list, keeping the list sorted in descending order by price.

Add the current node to the Bid's Nodes list. While adding a bid into the Matching Bids list or into the Future Inventory Purchase list, make sure that all the descendant nodes of the current node also hold the bid.

Constructing the Matching Tree

For each one of the existing bids, use the "Adding a New Bid" logic, as described above.

Removing a Bid

For each node in the Bid's Nodes list, remove the bid from the node and recursively remove the bid from all its descendants.

All nodes that have no more bids after the bid was removed from them, and have no children, will be removed from the tree.

Branches that were created by a bid, and hold other bids as a result of recursive insertion and sub tree coping, will also be removed from the tree if no other bids specifically referred to these branches.

Updating a Bid

To update bid B1 with bid B2, first apply "Removing a Bid" logic (above) and remove B1 from the Matching Tree. Then apply "Adding a new Bid" logic (above) to add the bid B2.

Searching the Tree and Allocating the Visitor's Advertisement Space

When a visitor requests an advertisement from the system, his profile is built. This results in a list of attributes and their values. The profile is sorted according to the attribute's order.

Searching the tree is done in the following way:

1. Current node=matching tree root.

2. For each of the values in the visitor's profile, sorted by the attribute's order (referred as current value):

2.1. If the current node has a child that matches the current value: Set the current node to this child.

Continue to the next value (step 2).

2.2 Else, Climb the value-tree of the current value, find the first value of the value's ancestors (by order of climbing) that matches one of the current node's children. If such child was found:

Set the current node to this child.

Continue to the next value (step 2).

2.3 If such child wasn't found, continue to the next value (step 2)

The search ends in a matching tree node, after all values in the profile were checked.

This node holds a list of matching bids and their prices, sorted in descending order by their prices, and a list of future inventory purchases.

If there are any future inventory purchases, select the first one and allocate the advertiser who bought that profile in advance, the advertisement space that will be represented to the visitor with that profile.

Otherwise, scan the matching bids list by price (in descending order) and check other constraints for finding the best bids (e.g. check that the bid has not expired, or check if the industry of the advertiser is not rejected by the site, etc.). Then, allocate the advertisement space that will be represented to the visitor with the given profile to the highest bidder that answers to the additional constraints.

Note that this algorithm enables matching a profile with a set of given bids in an almost fixed time (the search complexity does not depend on the number of bids that resides in the tree, but rather on the length of the user's profile).

Figure 6:
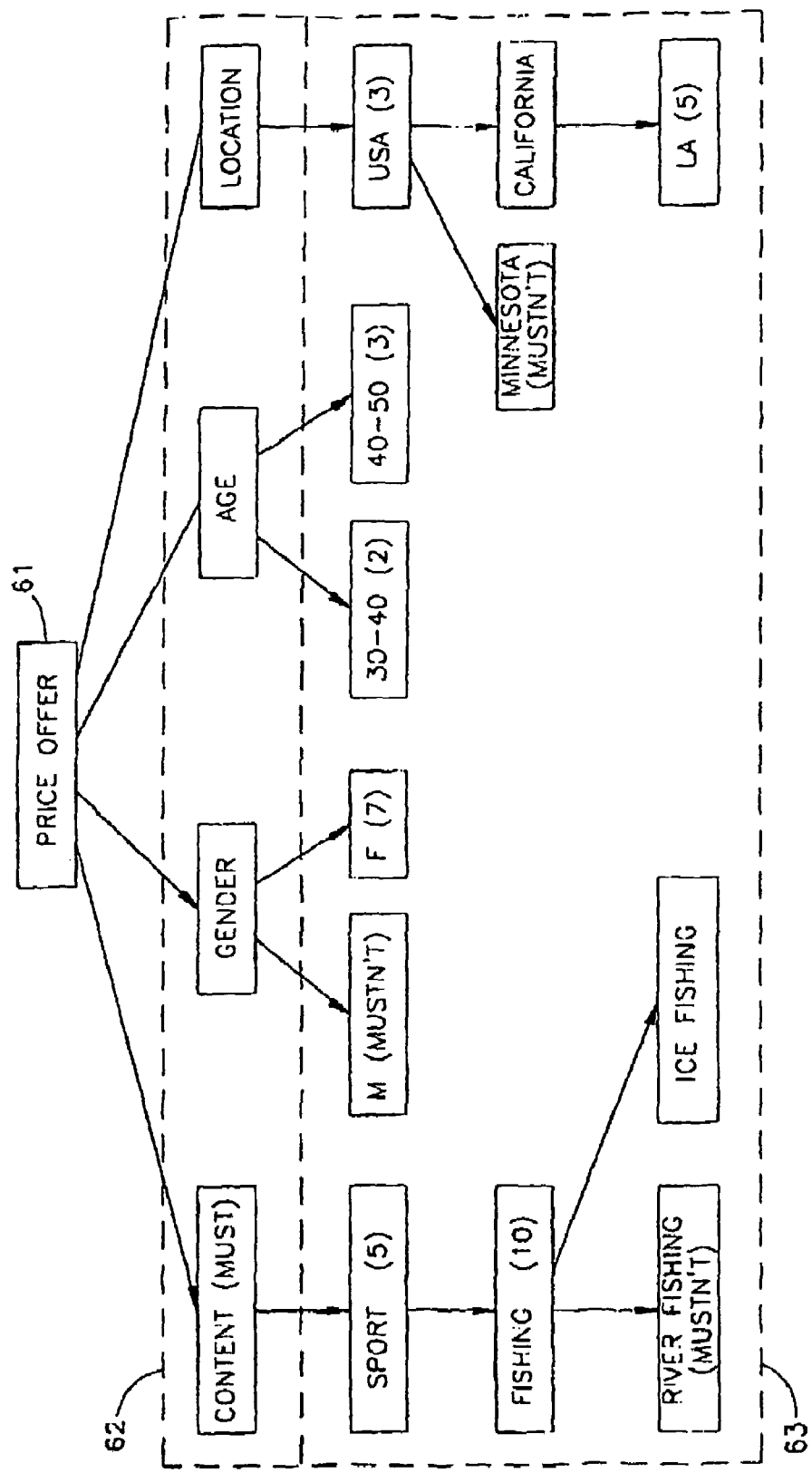
FIG. 6 illustrates a hierarchical structuring for a new offer.
Figure 8:
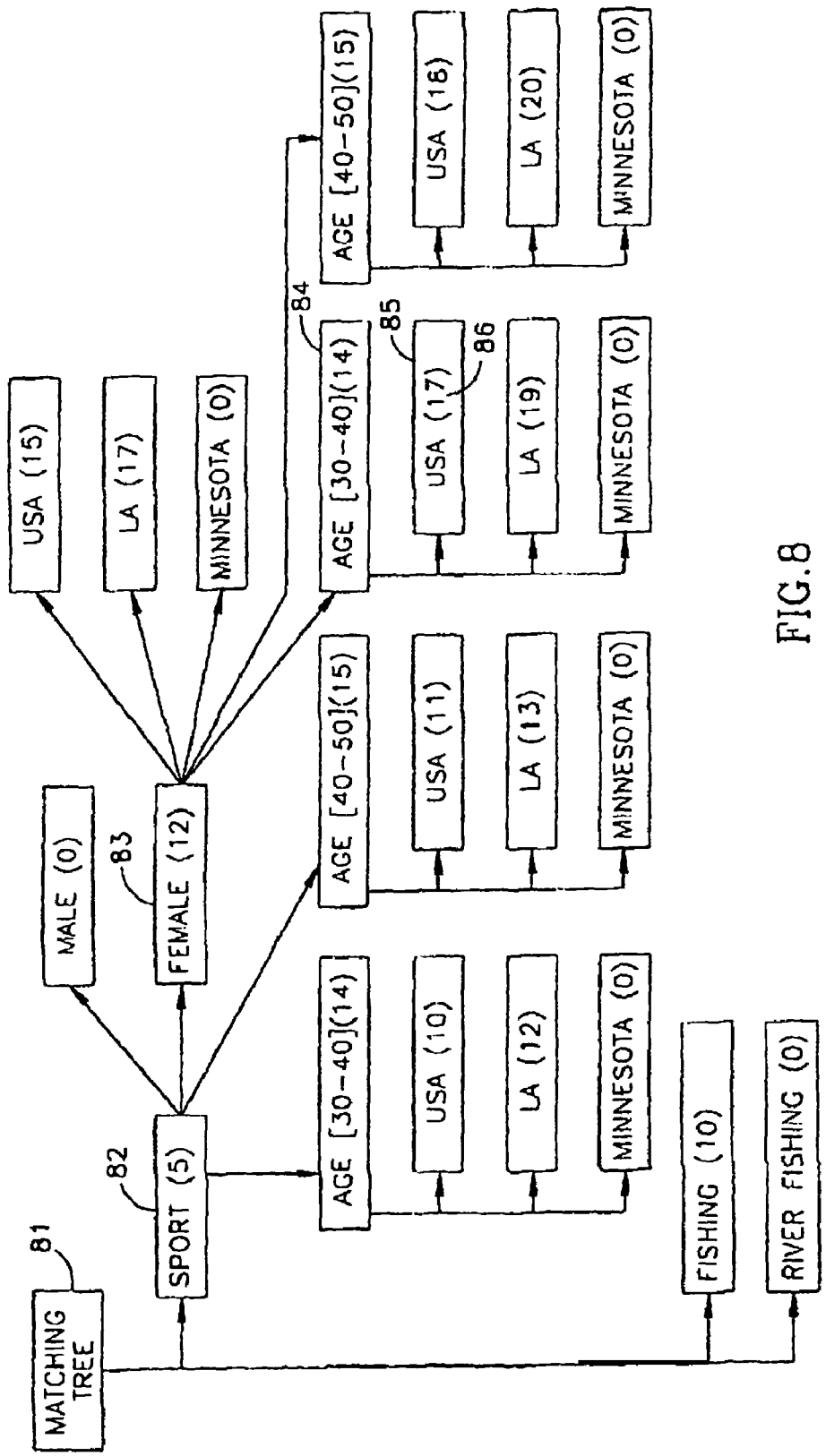
FIG. 8 illustrates a typical matching tree.

An Example is presented against the background structure presented in FIG. 6. The tree represents a new bid wherein a root 61 has primary category branches 62 each of which bifurcates into sub-categories 63. A sample data set (see FIG. 7) is shown 70, listing a plurality of bids, following the organization presented in FIG. 6. The first phase is to spread the bid into possible profile combinations. The only Must attribute is at the content level. FIG. 8 shows some of the branches that are created or inhabited by the above bid. However the organization of this tree is different than that given in FIG. 6, since the matching tree simultaneously addresses data organization for numerous specific price offer combinations. This is only a partial set of the bid's branches, and a small part of the entire matching tree that may hold a large number of bids (of course, many of the branches may inhabit several bids).

Searching the Tree and Allocating the visitor's advertisement space assume the incoming visitor has the following profile: content="Basketball", Gender="Female", Income="$50-70 k", Age="30-40", Location="California";

The above profile is sorted according to the predefined attribute's order Content, Gender, Income, Age, Location The search starts with the content at the matching tree's root 81. There is no child for the "Basketball" category.

Therefore look for the first value-tree ancestor of this category, which is "Sport" 82.

In the "Sport" sub tree, start searching for the child "Female" 83. This child exists, so continue the search in the child's sub tree.

Next is "$50-70 k". There is no Income attribute as a child of this sub tree. This value also does not have any value-tree ancestor that exists as a child in this sub tree, therefore continue to the next attribute.

Next is "Age 30-40" 84 which exists as a child. Continue to it's sub tree.

Next is "California" which doesn't exist as a child. "California" has a value-tree ancestor that is "USA" 85. Therefore find the child "USA".

This is the last value of this profile. In the last node find a list of all matching bids sorted by their price. The new bid also resides in this list with the price "17" 86. Select the highest bid under the given constraints, and allow this bidder to show its advertisement to the visitor.

Those versed in the art will realize that the above detailed description of a preferred embodiment relates to an implementation on computers of a type which are today normally connected to the Internet. Should a computer of a higher order computational capacity be used, then the present invention would preferably be implemented in a higher order Boyce-Codd normal form than that which has been described. While transforming data representations from lower to higher normal forms is conceptually straightforward, actual implementation should use a data base relational package which has been programmed to optimize the relevant data relationships.

Furthermore, as in all relational data constructions, large user population subscription may weaken implementation response times by causing underlying NP-complete like characteristics of the data transactions to effect the entire system. Therefore, even if the present invention is implemented on higher order computational equipment, it is advisable to maintain strict algebraic or combinatorial limits on the processing or on the equivalent data structure attributes (of the profile or the responses) used in the "selecting" of a response from the at least one responding distributors.

The algorithmic implementation strategy presented above supplies a matching of a given profile in a 'fixed' time (linear computation approximated time), thus making it an "optimal-type" algorithm in terms of response time. However, the algorithm implementation faces a scaling problem in terms of the tree size and its building time. The tree size (and its building time) may grow by up to exponential-time ratios with respect to the number of bids.

The scaling problem can be reduced and managed using different constraints and optimizations. One constraint, that can be used, is to reduce the number of attributes and values, thus significantly reducing the size of the tree and the time expended in building it.

Some optimizations can be used as well. One approach is to reduce the size of the tree at the expense of the matching time—between profiles and bids. This can be done, for example, by splitting the matching process itself from a single search to a parallel searches executing on multiple branches, thus eliminating the need for bids to reside in multiple branches.

Additional optimization can be gained by altering the structure of the tree. For example, building a tree which holds all values of the same attribute in the same level, and using a special value in each level for all the bids that did not use that attribute. These bids will reside in the sub-tree under the special value of the unused attribute. The special value "optimization strategy" reduces the number of searches required to complete a match—by preventing searches for attributes that were not bid for.

Another optimization can be applied by taking advantage of the nature of the attributes. For example, if there are attributes that are known to appear in every profile, branches that do not hold all those attributes will not be created.

Figure 9:
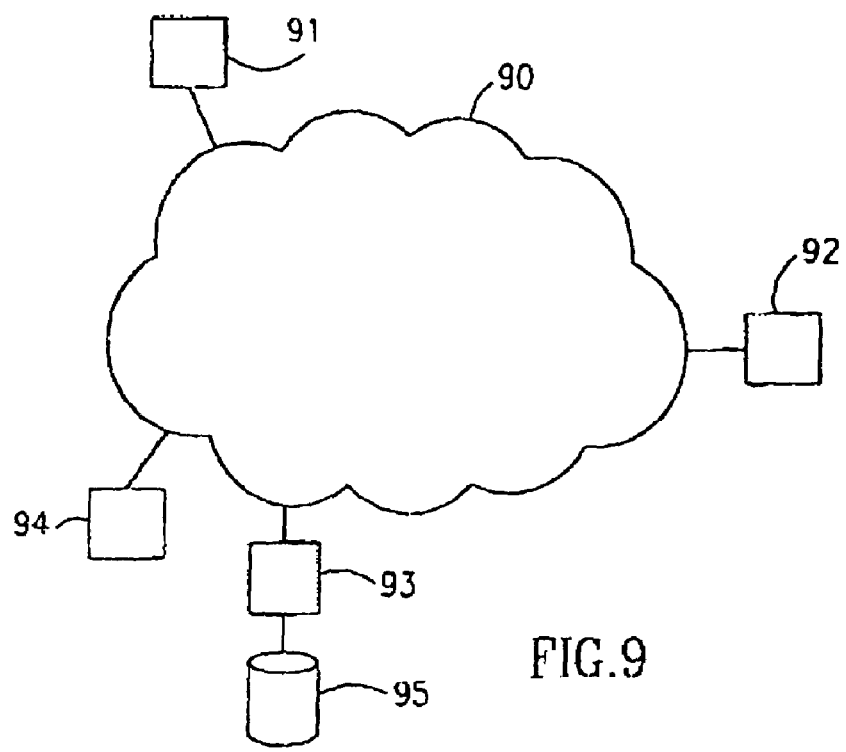
FIG. 9 a schematic diagram of the device of the present invention.

Turning to FIG. 9, in a data-communications topology 90 having a predetermined protocol (e.g. internet), an advertisement transfer transaction is facilitated between an advertisement distributor 91, a visitor 92, and a communications node 93 where the visitor is visiting (in interactive data-communications). The communications node may further negotiate its processing tasks with other nodes (e.g. 94) and may use a memory media 95 (e.g. for enhancing a profile) such as a global profile database. These nodes (e.g. 91, 92, 93) when transacting the method of the present invention together comprise a distributed system, wherein the communications node is a critical device in the transacting. However the processing tasks (according to another variation of the device of the present invention) are distributed between 91 and 93.

Figure 10:
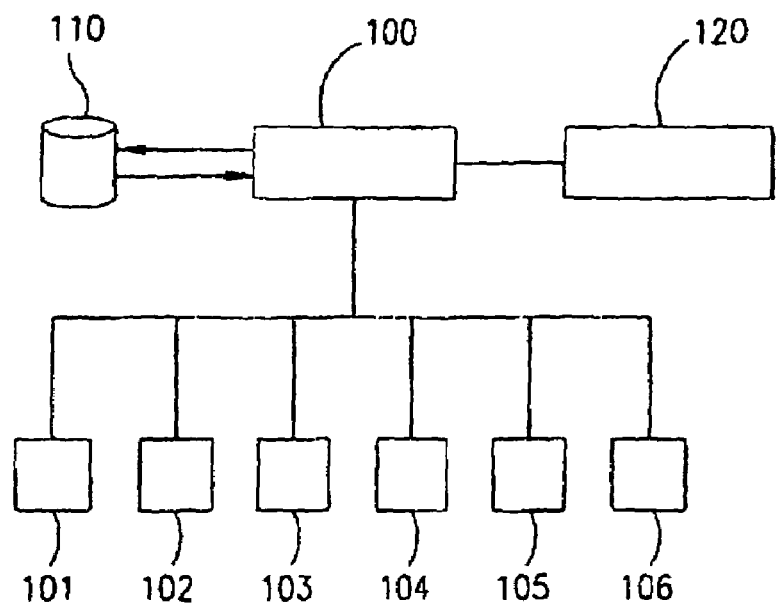
FIG. 10 is a schematic drawing of a device for transacting an advertising transfer.

FIG. 10 illustrates a schematic drawing of a device 100 for transacting an advertising transfer, from an advertisement distributor to a visitor, upon the occurrence of a visitor visitation at a communications node, comprising a sequentially linked series of modules:

a first module 101 for constructing a visitor profile;

a second module 102 for broadcasting the profile to at least one distributor;

a third module 103 for collecting responses from the at least one distributor;

a fourth module 104 for selecting a response from the at least one responding distributors;

a fifth module 105 for contracting, between the node and the at least one distributor of the selected response, a transference of an advertisement from the distributor to the visitor; and a sixth module 106 for effecting a transfer of the advertisement to the visitor.

According to the preferred embodiment of the device of the present invention, there is further provided at least one memory media 110 containing data collected or data constructed in at least one of the modules.

According to the preferred embodiment of the device of the present invention, there is further provided a distributor response module 120 for optimizing a selection from a plurality of broadcast profiles.

Furthermore, according to the preferred embodiment of the device of the present invention, the optimizing is according to a fixed budget, or according to an advertisement campaign model, or according to subsequent modifications thereto.

Those versed in the art will appreciate that there are many other ways of embodying the method and device of the present invention without departing from its spirit or scope.

For example, it will be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention. In particular, in the case where an intermediary is employed, this may be a suitably programmed computer for allowing selection of an advertisement distributor in accordance with the invention. It is further to be noted that the actual transfer of the advertisement may be effected either via the intermediary or directly by the selected distributor or via any other web server, and is not itself an integrally requisite feature of the invention.

I claim:

1. A method for automatically regulating opportunities for presenting electronic advertisements while a visitor is in contact with a communications node, the method comprising:

Upon a visitor visiting a communications node, electronically and automatically, and individually for that visitor:

(a) obtaining a profile of the visitor, which profile contains data identifying various attributes believed to be associated with the visitor;

(b) accessing pre-stored data derived from a plurality of pre-collected bids, the bids being for delivery of an associated advertisement to a visitor visiting the communications node, each of which plurality of bids having been collected by receiving:

(i) a first offer price if a visitor to the communications node has a subset of attributes; and (ii) at least one supplemental offer price if the visitor has an individual attribute in addition to the subset of attributes;

(c) identifying from the data which of the bids yields the greatest overall price for delivery of the associated electronic advertisement to the visitor visiting the communications node, the overall price for each bid being based on the total of (i) the first offer price associated with a subset of attributes that match the corresponding entries in the visitor's profile, and (ii) the at least one supplemental offer price, in each case where the individual attribute matches the correspoding entry in the visitor's profile;

(d) arranging for the delivery of the electronic advertisement associated with the identified bid to the visitor; and (e) recording billing data identifying the delivered advertisement and the price for delivery of the advertisement to the visitor pursuant to the identified bid.

2. The method of claim 1 wherein part (b) comprises accessing pre-stored data derived from pre-collected bids collected by receiving a first offer price for a subset of attributes consisting of a single attribute.

3. The method of claim 1 wherein part (b) comprises accessing pre-stored data representing, for each bid of the plurality, a plurality of pre-defined combinations of attributes and pre-calculated total offer prices therefor.

4. The method of claim 3 wherein part (b) comprises accessing pre-stored data representing, for each bid, all possible combinations of attributes and pre-calculated total offer prices therefor.

5. The method of claim 1 wherein:

(i) part (b) comprises accessing pre-stored data derived from at least one pre-collected bid collected by receiving, further, a maximum offer price capping the overall price for delivery of the associated advertisement, regardless of how many matching attributes a visitor has; and (ii) in part (c), the overall price for each such bid is based on the total of offer prices associated with matching attributes, constrained by the maximum offer price.

6. The method of claim 1 further comprising first:

(A) collecting a plurality of the bids by electronically receiving, for each of the collected plurality of bids:

(i) a first offer price if a visitor to the communications node has a subset of attributes; and (ii) at least one supplemental offer price if a visitor has an individual attribute in addition to the subset of attributes, and (B) storing data derived from the bids.

7. The method of claim 6 wherein collecting the plurality of bids further comprises receiving a maximum offer price capping the overall price for delivery of the associated advertisement, regardless of how many matching attributes a visitor has.

8. The method of claim 7 wherein collecting the plurality of bids further comprises receiving at least one of the supplemental offer prices expressed as a fraction of the associated first offer price.

9. The method of claim 1 wherein at least some attributes comprise the fact that the visitor lacks a certain characteristic.

10. The method of claim 1 wherein part (b) comprises accessing pre-stored data derived from at least one pre-collected bid collected by receiving at least one of the supplemental offer prices that is expressed as a fraction of the associated first offer price.

11. A computer system intended for use in automatically regulating opportunities for presenting electronic advertisements while a visitor is in contact with a communications node, the computer system comprising:

(a) a computer advertisement server; and (b) at least one electronic storage in communication with the server storing:

(i) first data specifying a plurality of bids for delivery of an associated advertisement to a visitor visiting the communications node, each of which plurality of bids including:

(A) a first offer price if a visitor to the communications node has a subset of attributes; and (B) at least one supplemental offer price if the visitor has an individual attribute in addition to the subset of attributes;

(ii) second data defining at least one combination of the first offer price and at least one of the supplemental offer prices;

(iii) third data identifying an electronic advertisement associated with each of the bids; and (iv) fourth data logging billing data;

(c) wherein the server is programmed, upon receiving a signal denoting a visitor visiting a communications node, electronically and automatically, and individually for that visitor, to:

(i) obtain a profile of the visitor, which profile contains profile data identifying various attributes associated with the visitor;

(ii) identify from the first or second data which of the bids yields the greatest overall price for delivery of the associated electronic advertisement to the visitor visiting the communications node, the overall price for each bid being based on the total of (A) the first offer price associated with a subset of attributes that match the corresponding entries in the visitor's profile, and (B) the at least one supplemental offer price, in each case where the individual attribute matches the corresponding entry in the visitor's profile;

(iii) arrange, using the third data, for delivery of the electronic advertisement associated with the identified bid to the visitor; and (iv) record fourth data identifying the delivered advertisement and the price for delivery of the advertisement to the visitor pursuant to the identified bid.

12. The apparatus of claim 11 wherein the second data in the electronic storage defines, for each bid, all possible combinations of the first offer price and the supplemental offer prices.

13. The apparatus of claim 11 wherein the electronic storage further stores data defining a maximum offer price capping the overall price for delivery of the associated advertisement, regardless of how many matching attributes a visitor has; and wherein, in part (c)(ii), the greatest overall price for each such bid is based on the total of offer prices associated with matching attributes, constrained by the maximum offer price.

14. The apparatus of claim 11 wherein the first data in the electronic storage specifies bids having at least some supplemental offer prices expressed as a fraction of the associated first offer price.

15. A computer program product comprising a computer readable storage medium storing a set of computer instructions in one or more modules that, when executed by one or more processors, performs the following method:
   (a) receiving a plurality of bids in the form of:
      (i) a first offer price if a visitor to a communications node has a subset of attributes; and
      (ii) at least one supplemental offer price if the visitor has an individual attribute in addition to the subset of attributes,
   and storing data identifying at least one combination of the first offer price and at least one of the supplemental offer price;
   (b) thereafter, automatically, and individually for a visitor visiting the communication node:
      (i) obtaining a profile of the visitor, which profile contains data identifying various attributes associated with the visitor;
      (ii) identifying from the stored data which of the bids yields the greatest overall price for delivery of the associated electronic advertisement to the visitor visiting the communications node, the overall price for each bid being based on the total of (A) the first offer price associated with a subset of attributes that match the corresponding entries in the visitor's profile, and (B) the at least one supplemental offer price, in each case where the individual attribute matches the corresponding entry in the visitor's profile;
      (iii) arranging for delivery of the electronic advertisement associated with the identified bid to the visitor; and
      (iv) recording billing data identifying the delivered advertisement and the price for delivery of the advertisement to the visitor pursuant to the identified bid.

16. The computer program product of claim 15 wherein the storing in part (a) comprises storing data defining, for each bid, all possible combinations of the first offer price and the supplemental offer prices.

17. The computer program product of claim 15 wherein the storing in part (a) comprises storing data identifying at least one combination of offer prices constrained by a maximum offer price capping the overall price for delivery of the associated advertisement, regardless of how many matching attributes a visitor has; and wherein the identifying in part (b)(ii) comprises causing the computer to identify the bid yielding the highest overall price for each such bid, constrained by the maximum offer price.

18. The computer program product of claim 15 wherein the storing in part (a) comprises storing data representing offer prices for supplemental attributes expressed as a fraction of the associated first offer price.

* * * * *